(12) United States Patent
Asai

(10) Patent No.: US 6,502,670 B1
(45) Date of Patent: Jan. 7, 2003

(54) MECHANICAL TYPE DRUM BRAKE DEVICE

(75) Inventor: Seiji Asai, Aichi-ken (JP)

(73) Assignee: Nisshinbo Industries Inc., Tokyo (JP)

( * ) Notice: Subject to any disclaimer, the term of this patent is extended or adjusted under 35 U.S.C. 154(b) by 0 days.

(21) Appl. No.: 09/364,542

(22) Filed: Jul. 29, 1999

(51) Int. Cl.[7] ................................................ B60T 1/00
(52) U.S. Cl. .................... 188/2 D; 188/106 A; 188/325
(58) Field of Search ...................... 188/74, 2 D, 106 A, 188/325, 326, 106 F, 78, 328

(56) References Cited

U.S. PATENT DOCUMENTS

| | | | | |
|---|---|---|---|---|
| 4,364,456 A | * | 12/1982 | Colpaert ................. | 188/106 A |
| 5,002,159 A | * | 3/1991 | Brix et al. ................. | 188/2 D |
| 5,092,428 A | * | 3/1992 | Kobayashi et al. ..... | 188/106 A |
| 5,137,120 A | * | 8/1992 | Barbosa ..................... | 188/2 D |
| 5,671,639 A | * | 9/1997 | Wagner et al. .......... | 188/2 D X |
| 5,706,914 A | * | 1/1998 | Goldstein ................. | 188/2 D |

* cited by examiner

Primary Examiner—Douglas C. Butler
Assistant Examiner—Melanie Torres
(74) Attorney, Agent, or Firm—SEED IP Law Group PLLC

(57) ABSTRACT

It is an object of this invention to provide a mechanical drum brake device which prevents a cable end from coming off from a brake lever without requiring an improvement in the brake shoe or the brake lever and an additional part. To that end, the lever return spring stretched between the brake shoe and the brake lever is utilized to restrict the lengthwise travel of the cable end along the shoe rim of the brake shoe.

18 Claims, 9 Drawing Sheets

MECHANICAL TYPE DRUM BRAKE DEVICE

TECHNICAL FIELD

This invention relates to a drum brake device, in which a brake shoe opens mechanically. More specifically, this invention relates to an improvement in a preventive means for an inner cable coming off from a brake lever.

BACKGROUND OF THE INVENTION

A drum brake device publicly known is a device in which the base end of a brake lever is pivotably mounted on the brake shoe. An inner cable which is an element of a parking brake cable is inserted through a U-shaped folded pocket formed at the tip of the brake lever, and a cable end fixed on the tip of the inner cable hooked on the U-shaped folded pocket of the brake lever at a non-pulling direction side. This is a brake device in which brake shoes are mechanically opened by pulling the inner cable from the outside of the drum brake.

Such a publicly known drum brake device has a possibility of the inner cable coming off from the U-shaped folded pocket while transporting or handling the drum brake device. As a preventive means for the inner cable coming off from the brake lever, in the Japanese Utility Model Gazette Number 2520404, one portion of brake shoe rim is notched and raised toward the inside of the brake shoe to form a projection, and the lengthwise travel of the cable end along the brake shoe rim is restricted to a certain range.

The above-explained method of preventing the inner cable from coming off has several points which may be improved. For example, if a projection restricting the lengthwise travel of the cable end is formed only on one brake shoe, relative to a pair of right and left brake shoes, the right and left brake shoes become dissymmetrical, thereby creating a possibility of misassembly as well as a problem of intricate parts maintenance.

In addition, if the projections restricting the lengthwise travel of the cable end are formed by modifying a section the shoe rim, such as by punching and bending two portions of the shoe rim to form cable-stopping projections on both sides of the shoe web in order to commonly design a pair of right and left brake shoes, the moment of inertia of area is reduced corresponding to the area of the modified section, thereby reducing the rigidity of the shoe rim.

Generally, a plurality of welding projections are provided at the center of the width direction of the shoe rim in order to be integrated with the shoe web. A plurality of beads may also be formed at some portions (normally three portions) of each side end of the width direction of the shoe rim so as to reduce the sliding resistance force for sliding on some ledge surfaces formed on the back plate when either opening or closing the brake shoes. A bead may be formed in an almost rectangle by bending the shoe rim in a right angle or a semicircle by drawing.

In addition, for restricting the lengthwise travel of the cable end, the shoe rim may be modified to form the cable-stopping projection between the welding projection and the bead, which makes it difficult to conduct the R-bending of the shoe rim corresponding to the periphery of shoe web by the rollering process. This forces manufacturers to conduct the R-bending by press with low efficiency. Especially, efficiency in forming the brake shoe is reduced as the shoe rim width becomes narrower.

A punched and bent cable-stopping (half blanking) projection may be added in a shoe rim pressing die, and an additional step of pressing for the projection may be included. These create needs for an improvement to reduce the cost.

SUMMARY OF THE INVENTION

This invention was made to mainly improve the above-mentioned points, and to that end, it is an object of this invention to provide a mechanical type drum brake device which prevents a cable end from coming off from a brake lever without requiring an additional part as well as making an improvement in a brake shoe and a brake lever. It is another object of this invention to provide a mechanical type drum brake device which is more economical.

In one aspect, an apparatus in accordance with the invention includes a brake shoe having a shoe rim, an approximately J-shaped brake lever rotatably pivotable with respect to said brake shoe and having a U-shaped folded pocket formed at a free end of said brake lever, a lever return spring stretched between said brake shoe and said brake lever, an inner cable of a parking brake cable inserted in said U-shaped folded pocket, and a cable end fixed on said inner cable hooked at a non-pulling side of said U-shaped folded pocket, said brake lever being rotatably pivoted by pulling said inner cable, thereby opening said brake shoe, wherein a movement of said cable end in the direction that said cable end travels lengthwise toward and along said shoe rim is restricted by said lever return spring. Alternately, the lever return spring may be a torsion spring, a tension coil spring, or some other type of spring.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE INVENTION

Figure 1:
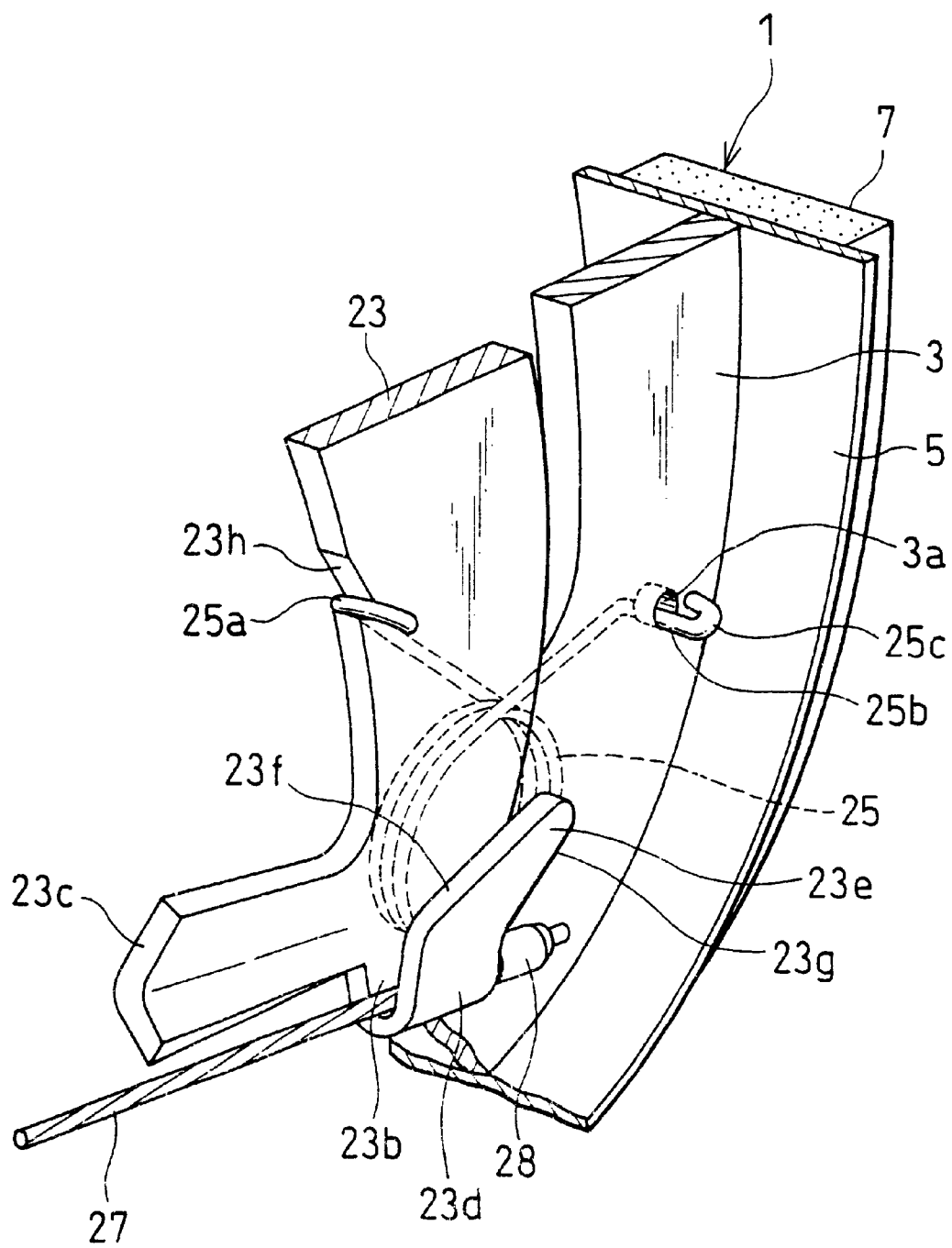
FIG. 1 is an isometric view from the back plate side with respect to the integrated section of the brake lever and inner cable.
Figure 2:
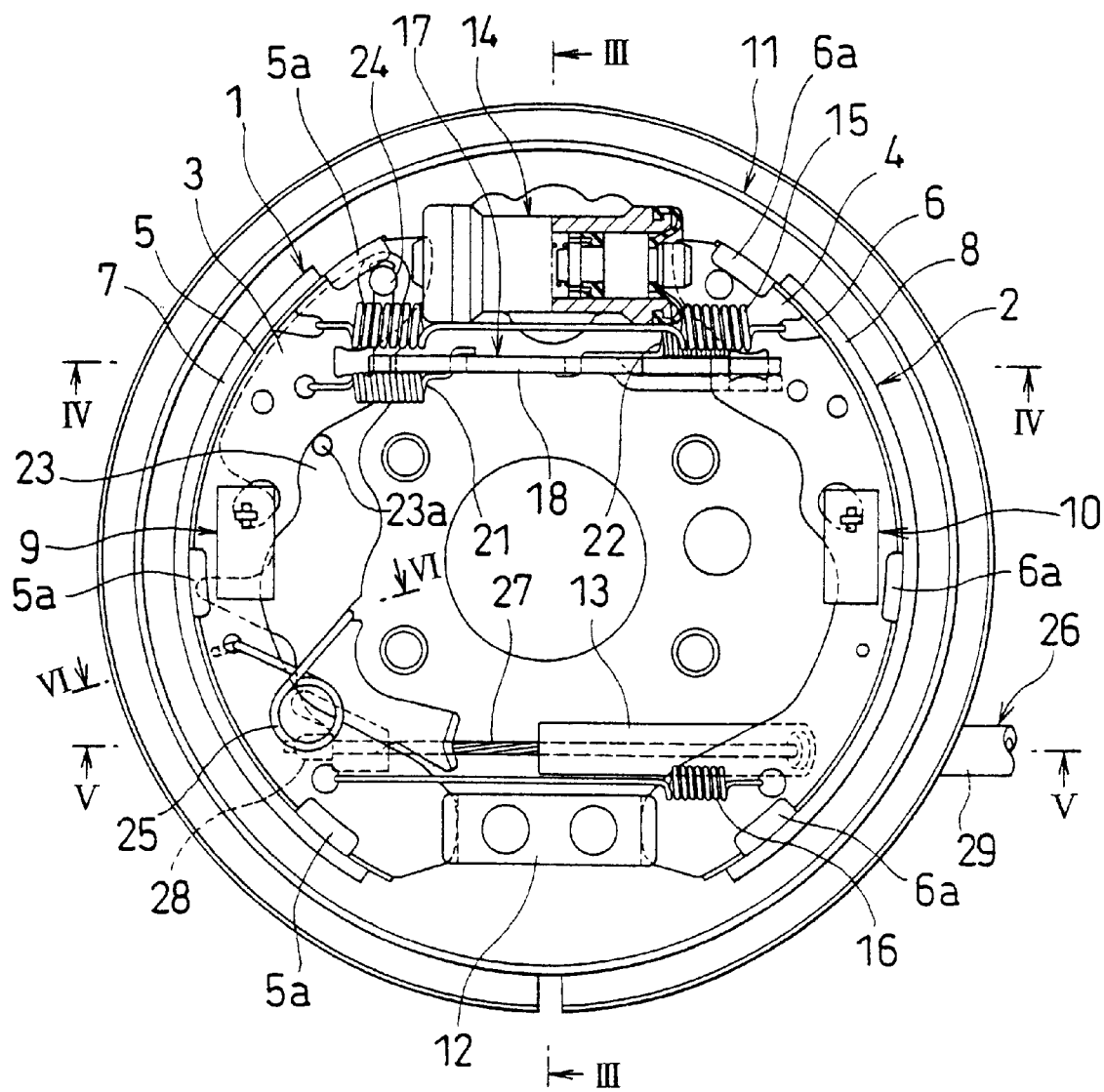
FIG. 2 is a plan view of the drum brake device.
Figure 3:
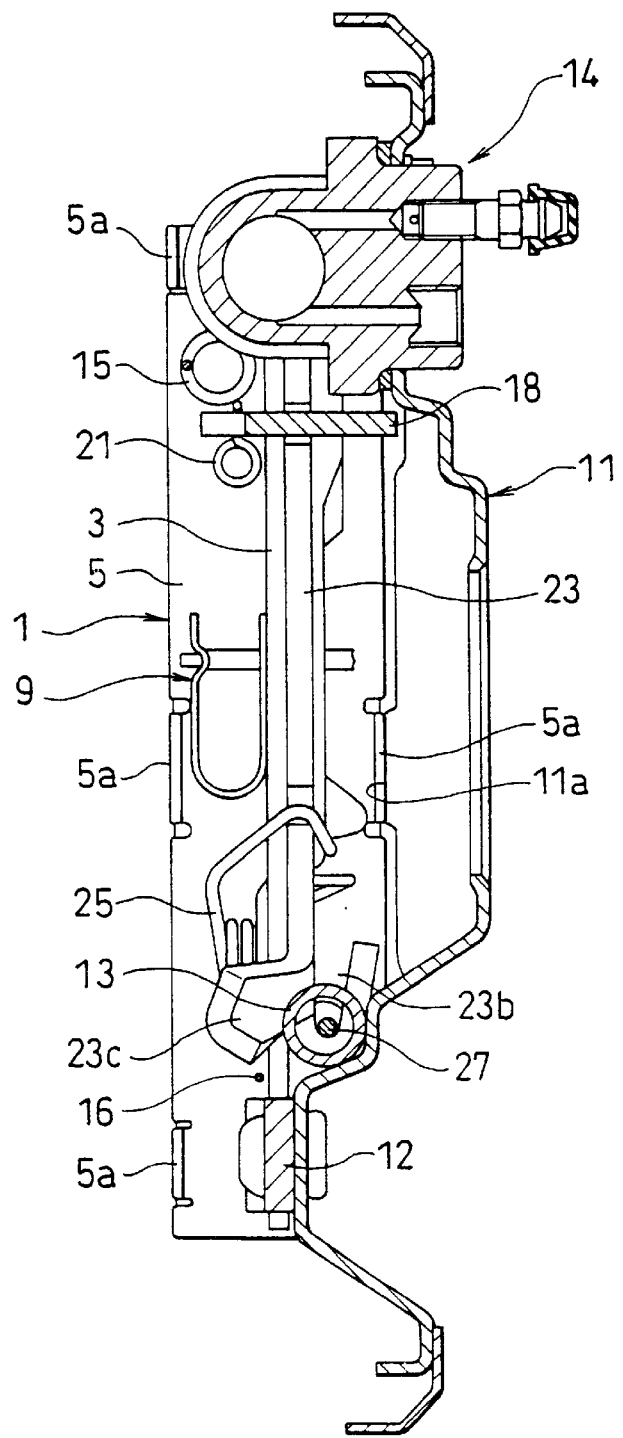
FIG. 3 is a cross section view taken along the line III—III in FIG. 2.
Figure 4:
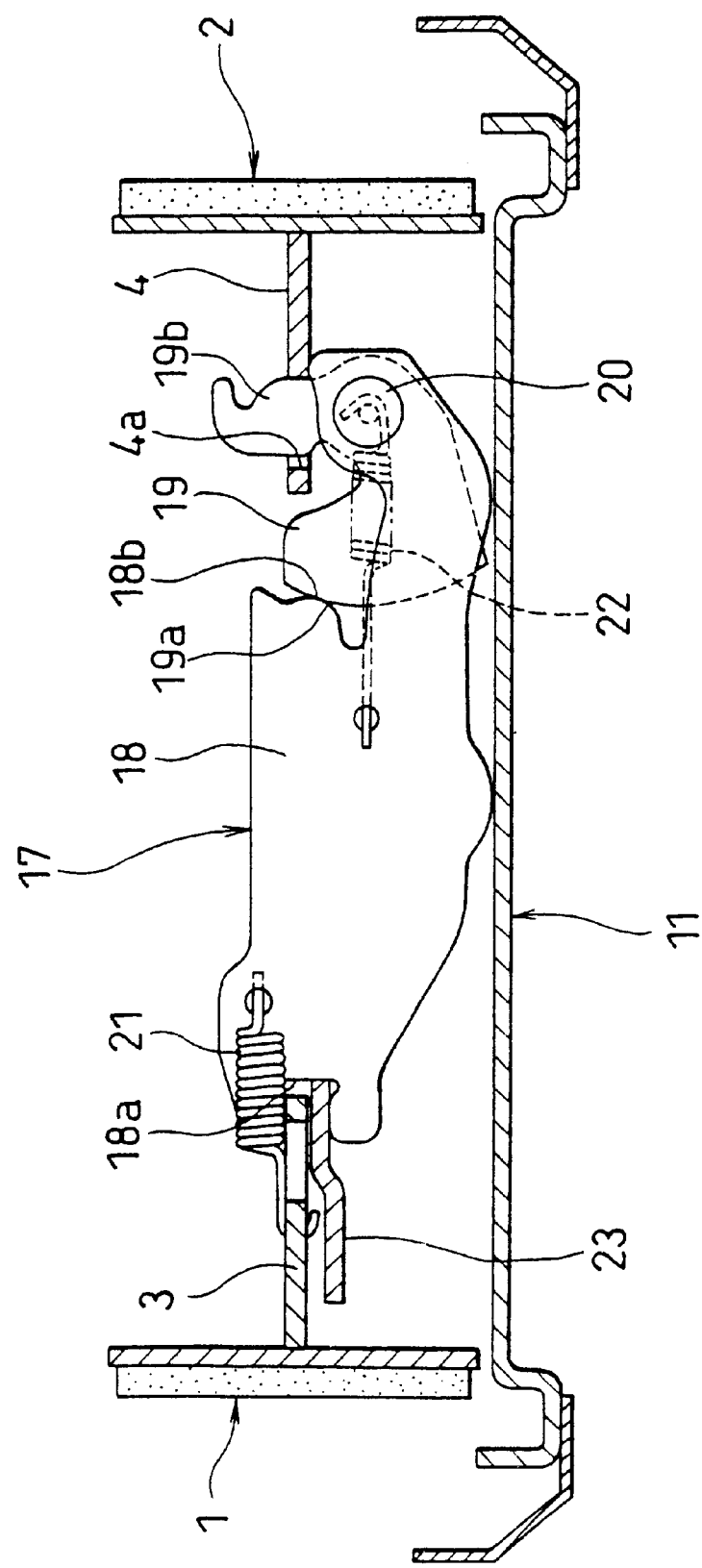
FIG. 4 is a cross section view taken along the line IV—IV in FIG. 2.

A first embodiment of this invention is explained with reference to FIGS. 1–6. A plan view of a leading-trailing type drum brake device is illustrated in FIG. 2, and a cross-section view at the center of the drum brake device is illustrated in FIG. 3. The drum brake of this embodiment is equipped with the wheel cylinder 14, which is an actuator for a service brake. The wheel cylinder 14, however, is not a vital element of this invention.

A pair of brake shoes 1, 2 has an identical structure, wherein each halfmoon-shaped shoe web 3, 4 and each shoe rim 5, 6 are integrated by the projection welding to form a T-shape in cross section, and each lining 7, 8 is fixed on the peripheral surface of each shoe rim 5, 6. The brake shoes 1, 2 are elastically mounted, with the beads 5*a*, 6*a* formed at the side ends of the width direction of the shoe rims 5, 6 on the ledge surface 11*a* (only a center ledge is shown in FIG. 3) formed on the back plate, by means of the shoe holding devices 9, 10. The lower adjacent ends of the shoe webs 3, 4 are supported by the anchor member 12, and the upper adjacent ends of the shoe webs 3, 4, each engage with a piston of the wheel cylinder 14. The upper return spring 15 and the lower return spring 16 are stretched between the pair of brake shoes 1, 2, and the brake shoes 1, 2 are forced to draw toward each other by the spring force.

An adjuster 17 which adjusts a clearance between the brake drum (not shown in the diagram) and the brake shoes 1, 2, is extended at the upper adjacent ends of the brake shoes 1, 2 which are adjacent to the wheel cylinder 14. The adjuster 17 is explained with reference to FIG. 4, wherein the shoe web 3 of one brake shoe 1 and the later-described brake lever 23 are fitted together in the groove 18*a* at the left end of the plate-shaped strut 18. The spring 21 provided between the left side of the strut 18 and the shoe web 3 applies the spring force in the direction to maintain the above-mentioned fitting. Therefore, the bottom of the groove 18*a* of the strut 18 abuts against the inner surface of the later-described brake lever 23.

At the right side of the strut 18, the bell crank lever 19 pivots with the pin 20 as the fulcrum so that it may be rotatable and movable along the plate surface on the strut 18 in the longitudinal direction.

At the left side of the bell crank lever 19, the small teeth 19*a* formed on the peripheral surface engages with the small teeth 18*b* formed at the center of the strut 18. The spring 22 extended between the strut 18 and the pin 20 applies the spring force in the direction to maintain the engagement of both tooth 18*b* and 19*a*. In addition, the cam arm 19*b* at the right side of the bell crank lever 19 is freely fitted in the rectangular hole 4*a* bored on the shoe web 4 of the other brake shoe 2. The mounting load of both springs 21 and 22 is designed so that the spring 21 at the left side of the diagram is larger than the spring 22 at the right side of the diagram.

In the above-mentioned structure, when the wheel cylinder 14 is activated, both brake shoes 1, 2 spread open with the abutment point with the anchor member 12 as the fulcrum and frictionally engage with the brake drum (not shown in the diagram). At this point, since the adjuster 17 follows one brake shoe 1, if the linings 7, 8 wear out, the cam arm 19*b* of the bell crank lever 19 is pressed by the rectangle hole 4*a* to rotate clockwise with the pin 20 as the fulcrum, then the next teeth 19*a* of the bell crank lever 19 engage with the teeth 18*b* of the strut 18. Therefore, the abutment point against the rectangular hole 4*a* of the cam arm 19*b* displaces, thereby automatically extending the outside diameter of the brake shoes 1, 2.

The adjuster 17, which restricts the radial position of the brake shoes 1, 2, is not limited to the type described in this embodiment. For example, a screw type with a bolt and nut may be used instead of the adjuster 17 in this embodiment. At least, an adjuster needs to restrict the radial position of the brake shoes 1, 2 to properly adjust a clearance between the brake shoes 1, 2 and the brake drum (not shown in the diagram).

A mechanical type parking brake device in this drum brake comprises the brake lever 23, the above-described adjuster 17, and the parking brake cable 26.

As shown in FIG. 2, almost J-shaped brake lever 23 as a defensive operating element is superimposed on the shoe web 3 of one brake shoe 1 at the back plate 11 side, and the base portion of the brake lever 23 rotatably pivots at the upper portion of the shoe web 3 via the pin 24.

The lever return spring 25 is stretched between the shoe web 3 and the brake lever 23, and energizes the brake lever 23 to rotate clockwise (toward the position while not in braking operation) with the pin 24 as the fulcrum. The clockwise rotation of the brake lever 23 is restricted to the predetermined amount by abutting the stopper 23*a* projected on the brake lever 23 against the inner circumferential edge of the shoe web 3.

At the free end of the brake lever 23, the later-described inner cable 27 is installed, and the U-shaped folded pocket 23*b* is formed by bending the free end of the brake lever 23 into a U-shape (or other suitable retaining shape), where the cable end 28 fixed at the inner cable end is temporarily fixed. The guiding means 23*c* exposed from the body side of the U-shaped folded pocket 23*b* toward the pulling direction of the inner cable 27, and the guiding hook 23*e* exposed from the folded side 23*d* end of the U-shaped folded pocket 23*b* toward non-pulling direction of the inner cable 27, are integrally formed.

The guiding means 23*c* of the brake lever 23 is formed in a spoon-like device so as to facilitate the guidance of the cable end 28 on the temporary fixing portion. In addition, as the guiding hook 23*e*, there are a sloping guide surface 23*f* to guide the cable end 28 on the temporary fixing portion of the U-shaped folded pocket and a stopper surface 23*g* to restrict the movement of the cable end 28 toward the opening of the U-shaped folded pocket 23*b* while the cable end 28 is temporarily fixed on the U-shaped folded pocket 23*b*. The guide surface 23*f* functions, in combination with the guiding means 23*c*, to guide the cable end 28 toward non-pulling side at the U-shaped folded pocket 23*b* and to guide the position of the inner cable 27 adjacent to the cable end 28 inside the U-shaped folded pocket 23*b*. Here, the cable end 28 may be guided to be fixed temporarily in the U-shaped folded pocket 23*b* by just inserting the inner cable 27 from the cable pulling side. Further, when assembly from outside of the drum brake with a brake drum (not shown in the diagram) is preferable, the guide pipe 13 that guides the cable end 28 toward the guiding means 23*c* may be provided on the back plate 11.

After connecting both ends of the inner cable 27 with the predetermined lever, the stopper surface 23*g* functions to prevent the cable end 28 coming off from the U-shaped folded pocket 23*b*.

The above-described guiding means 23*c* of the brake lever 23 is just for inserting the cable end 28 and is not a requirement of this invention. Therefore, a conventional type brake lever, where the cable end 28 is temporarily fixed on the U-shaped folded pocket 23*b* manually, is applicable and also the brake lever 23 may be superimposed on the shoe web at the opposite side of the back plate side. The brake lever 23 of this invention at least requires the U-shaped folded pocket 23*b* to temporarily fix the cable end 28.

Figure 5:
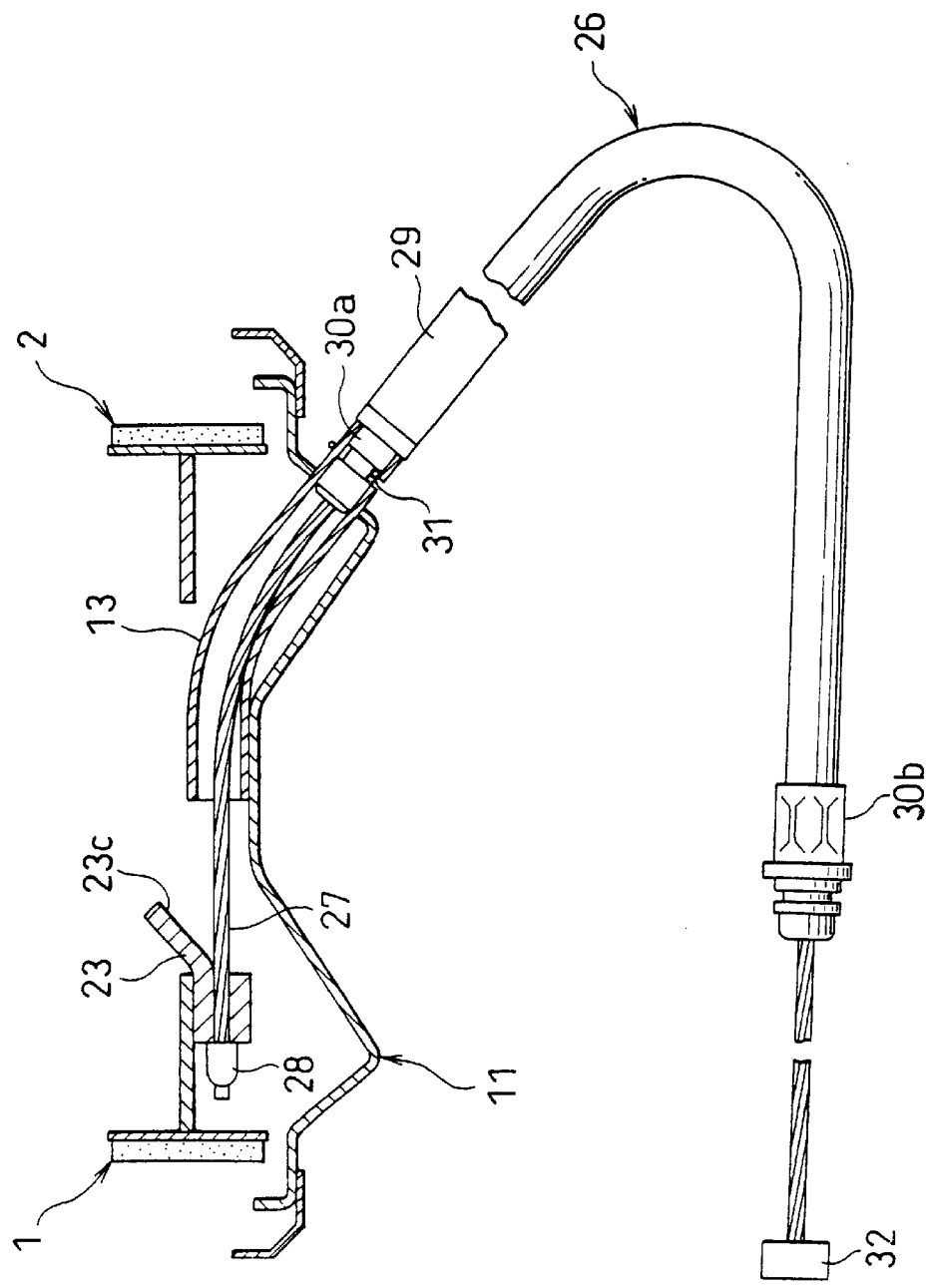
FIG. 5 is a cross section view taken along the line V—V in FIG. 2.

As shown in FIG. 5, the parking brake cable 26 comprises the inner cable 27 and the outer casing 29. The casing caps 30a, 30b are fixed on both ends of the outer casing 29. One casing cap 30a is fixed by the snap ring 31 at the curved guide pipe 13 fixed on the back plate 11, and the other casing cap 30b is fixed on the stationary part. In addition, the cable end 32 fixed on the other side of the inner cable 27 is connected to a hand brake lever or a foot pedal of the pedal type parking brake (both not shown in the diagram).

In the above-described structure, if the inner cable 27 of FIG. 2 is pulled to the right, the brake lever 23 rotates counter-clockwise with the pin 24 as the fulcrum, and the other brake shoe 2 frictionally engages with the brake drum (not shown in the diagram) via the adjuster 17. Then, as the brake lever 23 rotates with the point of abutment with the adjuster 17 as the fulcrum, one brake shoe 1 frictionally engages with the brake drum via the pin 24.

Prior to connecting the cable end 32 of the inner cable 27 at the other side of the parking brake cable 26 to the hand brake lever or a foot pedal of the pedal type parking brake and connecting the casing cap 30b of the outer casing 29 to the stationary part, one cable end 28 may excessively travel lengthwise until it abuts the inner surface of the shoe rim 5 when in transport and during handling. In this invention, as a means to prevent the cable end 28 from coming off from the U-shaped folded pocket 23b, the lever return spring 25, stretched between the shoe web 3 and the brake lever 23, is practically utilized so as to restrict the lengthwise travel of the cable end 28 along the shoe rim 5 of the brake shoe 1 (ie. restrict the lengthwise travel of the cable end 28 away from the pocket 23b).

Figure 6:
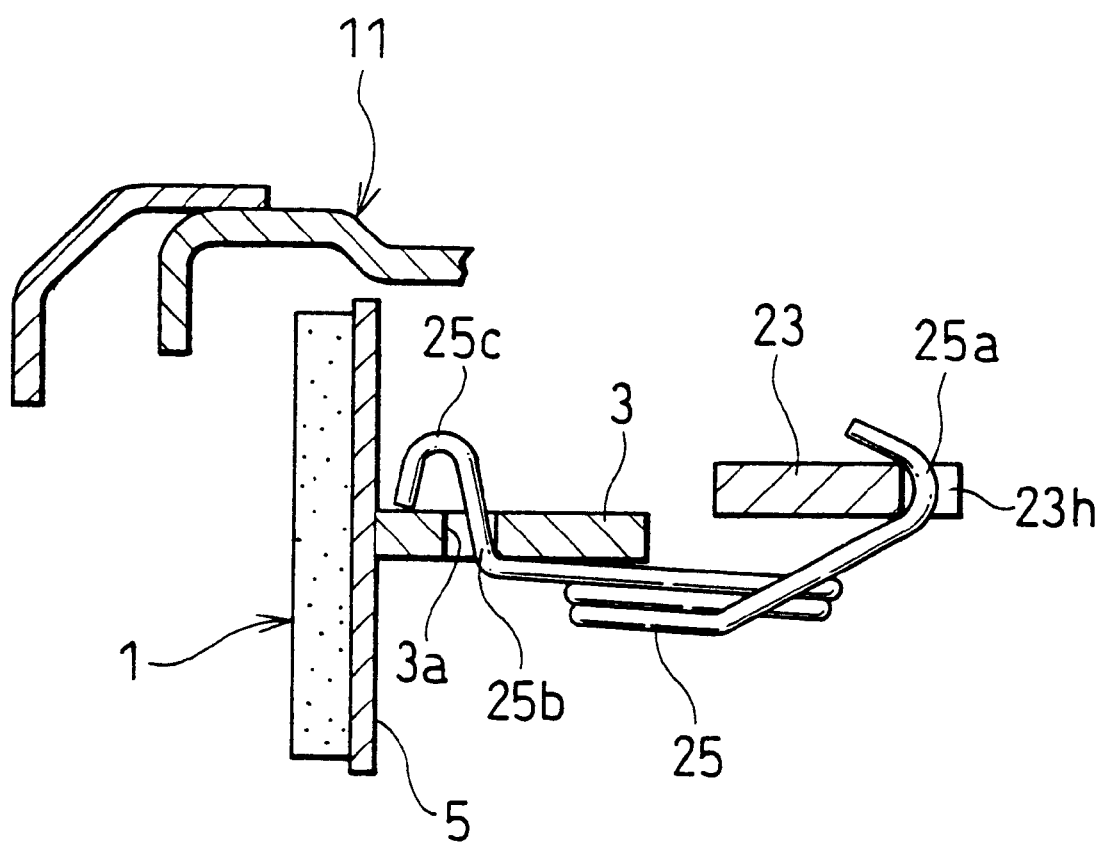
FIG. 6 is a cross section view taken along the line VI—VI in FIG. 2.

That is, as shown in FIG. 6, the lever return spring 25 is a torsion spring. The hook 25a formed at one end of the steel wire for a spring is temporarily fixed on the concavity 23h of the brake lever 23, and almost semicircular hook 25b formed at the other end of the steel wire for a spring is inserted through the temporary fixing hole 3a of the shoe web 3. The almost semicircular hook 25b protrudes through the backside of the shoe web 3 (i.e., back plate 11 side) to form the semicircular protrusion 25c, and the end surface of the protrusion 25c abuts against the backside of the shoe web 3 to be temporarily fixed.

This embodiment illustrates the case when the other end of the steel wire for a spring is bent to form a semicircular protrusion 25c, however, a shape of the protrusion 25c may be a V-shape, a reverse C-shape, and the like instead of semicircular protrusion 25c. At the least, the lengthwise travel of the cable end 28 along the shoe rim 5 (away from the pocket 23b) needs to be restricted by locating the protrusion 25c of the hook 25b formed at the other end so as the cable end 28 not to come off from the U-shaped folded pocket 23b.

Accordingly, the lever return spring 25 functions not only as a return spring for the brake lever 23 and the inner cable 27 but also as a preventive means for the cable end 28 coming off from the U-shaped folded pocket 23b of the brake lever 23.

In the following description of additional embodiments of this invention, the components which are the same as in the above-described embodiment are identified with the same reference numbers wherein an explanation is omitted here.

Figure 7:
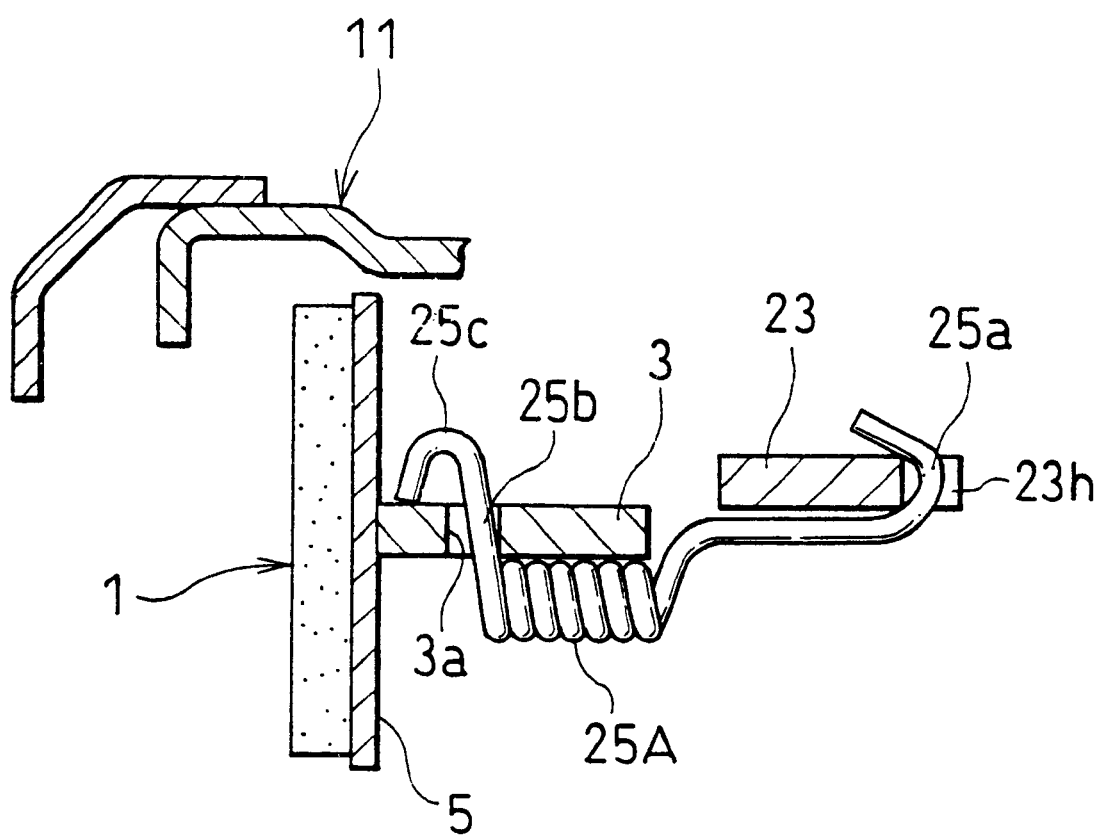
FIG. 7 is another embodiment with a coil spring as a lever return spring.

FIG. 7 illustrates another embodiment wherein the lever return spring 25A is a tension coil spring formed by coiling a steel wire for a spring.

With respect to the lever return spring 25A, the hook 25a is temporarily fixed on the concavity 23h of the brake lever 23, and the hook 25b formed at the other end of the steel wire for a spring is inserted through the temporary fixing hole 3a formed on the shoe web 3. The semicircular portion of the hook 25b protrudes through the backside (back plate 11 side) of the shoe web 3 to form the semicircular protrusion 25c, and the semicircular protrusion 25c restricts the lengthwise travel of the cable end 28 along the shoe rim 5 of the brake shoe 1.

Figure 8:
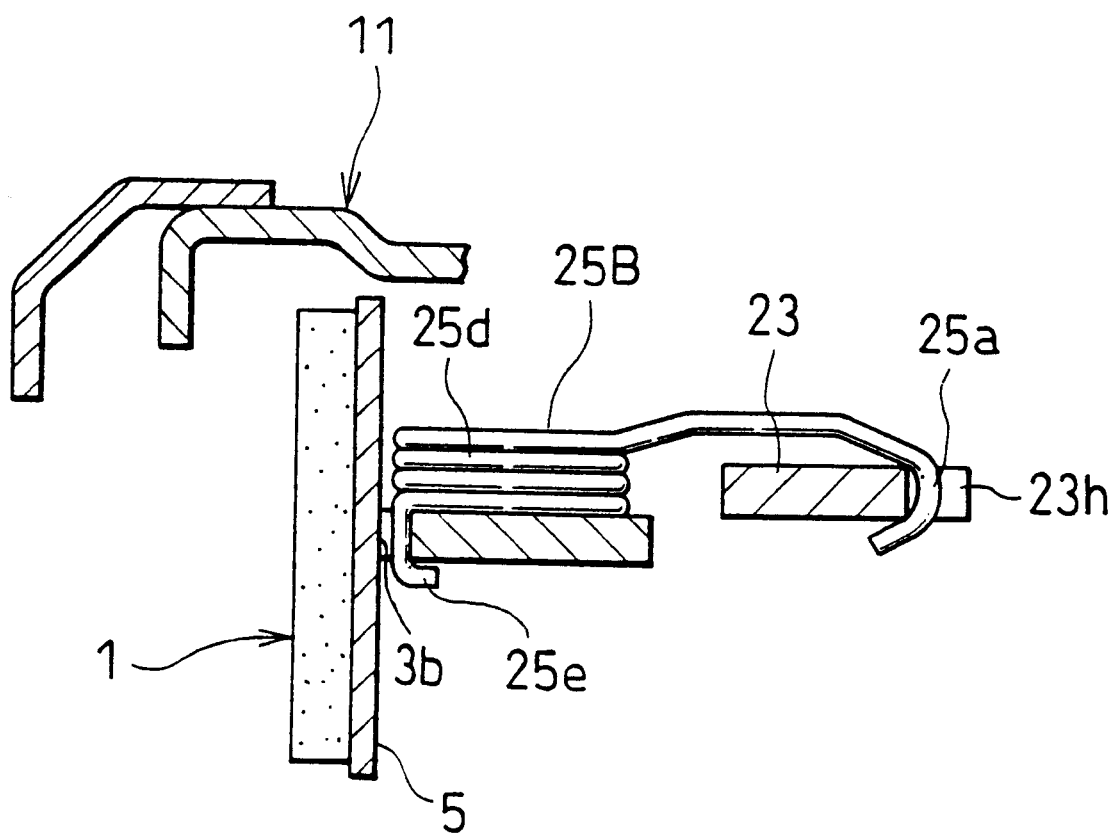
FIG. 8 is another embodiment with a torsion spring as a lever return spring.
Figure 9:
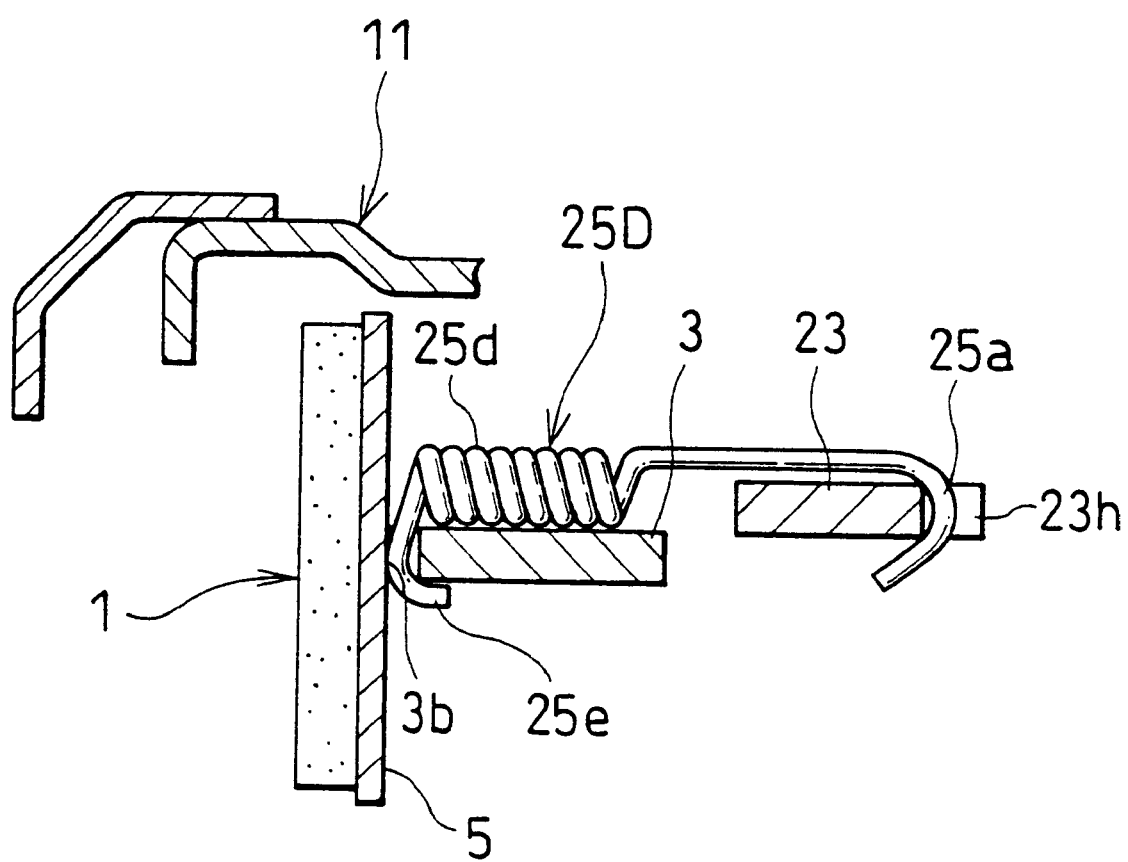
FIG. 9 is another embodiment of a coil spring as a lever return spring.

FIGS. 8 and 9 illustrate still another embodiment wherein the coil portions 25d, 25d of the lever return springs 25B, 25D are used to restrict the lengthwise travel of the cable end 28 along the shoe rim 5. FIG. 8 illustrates when the lever return spring 25B is a torsion spring, and FIG. 9 illustrates when the lever return spring 25D is a tension coil spring. In either case, the coil portion 25d of the respective lever return springs 25B, 25D needs to positioned along the lengthwise travel path of the cable end 28 along the shoe rim 5 of the brake shoe 1.

The hook 25e is formed at one side of the lever return spring 25B or 25D to be temporarily fixed on the shoe web 3, and the temporary fixing hole 3b is formed by the notch of the periphery of the shoe web 3 and the inner surface of the shoe rim 5 to temporarily fix the hook 25e.

As is evident from the aforementioned configurations, this invention provides several advantages. One advantage is that a lever return spring stretched between the brake shoe and the brake lever is utilized to restrict the lengthwise travel of the cable end along the brake shoe rim and to prevent the cable end from coming off from the U-shaped folded pocket of the brake lever where the cable end is once temporarily fixed. Accordingly, no special change is necessary to either brake shoe or brake lever as the conventional arts required. Further, no additional part is required, which remarkably reduces the cost.

No special lever return spring is necessary to restrict the lengthwise travel of the cable end along the brake shoe rim and to prevent the cable end from coming off from the U-shaped folded pocket of the brake lever, that is the torsion spring or tension coil spring are sufficient if modified to have a fixing hook at an appropriate portion.

Another advantage is that no improvement is necessary in the brake shoe, thereby eliminating problems of reducing the processability and rigidity of the brake shoe, and reducing the possibility of misassembly of the brake shoe and drum brake assembly.

It is readily apparent that the above-described also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A mechanical type drum brake device, comprising:
   a mechanically operable brake shoe having a shoe rim and a shoe web;
   a brake lever pivotably superimposed on a surface of said shoe web at a back plate side to operate said brake shoe, the brake lever having a U-shaped folded pocket formed at a free end of said brake lever, the folded pocket terminating at the free end at a maximum height with respect to a base of the U-shaped folded pocket;
   a brake cable received in said U-shaped folded pocket;
   an enlarged cable end on said brake cable being impinged against a non-pulling side of said U-shaped folded pocket; and a biasing member engaged between said brake shoe and said brake lever, a portion of said biasing member projecting from said shoe web at a preselected location to physically obstruct a movement of the enlarged cable end and prevent a movement of said cable end lengthwise toward and along said shoe rim to a point where the cable elevates above the maximum height.

2. A mechanical type drum brake device as claimed in claim 1 wherein said biasing member is a torsion spring.

3. A mechanical type drum brake device as claimed in claim 1 wherein said biasing member is a tension coil spring.

4. A mechanical type drum brake device as claimed in claim 1 wherein said biasing member includes a fixing hook positioned along a lengthwise travel path of said cable end along said shoe rim.

5. A mechanical type drum brake device as claimed in claim 2 wherein said biasing member includes a fixing hook positioned along a lengthwise travel path of said cable end along said shoe rim.

6. A mechanical type drum brake device as claimed in claim 3 wherein said biasing member includes a fixing hook positioned along a lengthwise travel path of said cable end along said shoe rim of the brake shoe.

7. A mechanical type drum brake device as claimed in claim 1 wherein said biasing member includes a coil portion positioned along a lengthwise travel path of said cable end along said shoe rim of the brake shoe.

8. A mechanical type drum brake device as claimed in claim 2 wherein said biasing member includes a coil portion positioned along a lengthwise travel path of said cable end along said shoe rim of the brake shoe.

9. A mechanical type drum brake device as claimed in claim 3 wherein said biasing member includes a coil portion positioned along a lengthwise travel path of said cable end along said shoe rim of the brake shoe.

10. A drum brake device, comprising:

a brake shoe having a shoe rim;

a brake lever proximate said brake shoe and movable with respect thereto at a back plate side to actuate said brake shoe, the brake lever having a pocket formed at a free end thereof;

a biasing member coupled between said shoe rim and said brake lever;

a cable extending through said pocket and having an enlarged cable end impinged thereon, said brake lever being moveable with said cable to actuate said brake shoe; and a portion of said biasing member projecting from said brake shoe to be below a preselected escape height such that upward travel of said cable out of said pocket is physically prevented by said portion of the biasing member.

11. The device of claim 10 wherein said biasing member comprises a torsion spring.

12. The device of claim 10 wherein said biasing member comprises a tension coil spring.

13. The device of claim 10 wherein said biasing member includes a fixing hook at least partially positioned across a direction of lengthwise travel of said cable end.

14. The device of claim 10 wherein said biasing member includes a coil portion at least partially positioned across a direction of lengthwise travel of said cable end.

15. The device of claim 10 wherein said brake lever includes a concavity and said biasing member includes a hooked end engaged to said concavity.

16. The device of claim 10 wherein said brake shoe includes a fixing hole and said biasing member includes a hooked end engaged through said fixing hole.

17. The device of claim 10 wherein said brake lever includes a cable guide proximate said pocket, said cable guide projecting approximately along a direction of lengthwise travel of said cable.

18. The device of claim 10, further comprising a guide pipe having a first end accessible from outside the device and a second end proximate the brake lever, the cable being at least partially disposed within the guide pipe.

* * * * *

UNITED STATES PATENT AND TRADEMARK OFFICE
CERTIFICATE OF CORRECTION

PATENT NO. : 6,502,670 B1
DATED : January 7, 2003
INVENTOR(S) : Seiji Asai

It is certified that error appears in the above-identified patent and that said Letters Patent is hereby corrected as shown below:

<u>Title page,</u>
Item [30], Foreign Application Priority Data, should read as:
-- Aug. 7, 1998 (JP) …….. 10-224266 --

Signed and Sealed this

Twentieth Day of May, 2003

JAMES E. ROGAN
*Director of the United States Patent and Trademark Office*